US012720291B2

(12) United States Patent
Van Phan et al.

(10) Patent No.: US 12,720,291 B2
(45) Date of Patent: Aug. 25, 2026

(54) APPARATUS, METHOD, AND COMPUTER PROGRAM

(71) Applicant: Nokia Technologies Oy, Espoo (FI)

(72) Inventors: Vin Van Phan, Oulu (FI); Ling Yu, Kauniainen (FI); György Tamás Wolfner, Budapest (HU); Hannu Petri Hietalahti, Kiviniemi (FI)

(73) Assignee: Nokia Technologies Oy, Espoo (FI)

( * ) Notice: Subject to any disclaimer, the term of this patent is extended or adjusted under 35 U.S.C. 154(b) by 758 days.

(21) Appl. No.: 18/098,288

(22) Filed: Jan. 18, 2023

(65) Prior Publication Data

US 2023/0232202 A1 Jul. 20, 2023

(30) Foreign Application Priority Data

Jan. 18, 2022 (EP) .................................... 22152050

(51) Int. Cl.
*H04W 8/00* (2009.01)
*H04W 76/14* (2018.01)

(52) U.S. Cl.
CPC ........... *H04W 8/005* (2013.01); *H04W 76/14* (2018.02)

(58) Field of Classification Search
CPC ..... H04W 8/005; H04W 76/14; H04W 92/18; H04W 88/04; H04W 4/06; H04W 40/22; H04W 8/24; H04L 47/30
See application file for complete search history.

(56) References Cited

U.S. PATENT DOCUMENTS

| | | | | |
|---|---|---|---|---|
| 9,713,072 | B2 | 7/2017 | Liao et al. | |
| 10,674,553 | B2 | 6/2020 | Kim et al. | |
| 10,924,912 | B2 | 2/2021 | Kim et al. | |
| 2018/0192280 | A1* | 7/2018 | Kuge | H04W 8/005 |
| 2018/0234862 | A1* | 8/2018 | Lee | H04W 88/04 |
| 2018/0317268 | A1* | 11/2018 | Kim | H04W 8/24 |
| 2022/0103997 | A1* | 3/2022 | Kang | H04W 8/005 |
| 2023/0345456 | A1* | 10/2023 | Dees | H04L 47/30 |

FOREIGN PATENT DOCUMENTS

| | | | |
|---|---|---|---|
| EP | 3 618 391 | A1 | 3/2020 |
| IN | 201841018063 | A | 11/2019 |
| WO | WO 2016/073984 | A2 | 5/2016 |
| WO | WO 2017/171897 | A1 | 10/2017 |
| WO | WO 2018/071517 | A1 | 4/2018 |
| WO | WO 2021/248096 | A1 | 12/2021 |

(Continued)

OTHER PUBLICATIONS

Sebastian et al. "Optimal, Distributed, Timer-Based Best Two Relay Discovery Scheme for Cooperative Systems", IEEE Global Communications Conference Dec. 9-13, 2013.

(Continued)

*Primary Examiner* — Vinncelas Louis
(74) *Attorney, Agent, or Firm* — Lippes Mathais LLP

(57) ABSTRACT

An apparatus, method and computer program are provided that relates to determining that a condition indicating that at least one first user equipment needs a sidelink communication with a second user equipment is met; and determining to use a first discovery model including broadcasting a discovery announcement to the at least one first user equipment.

16 Claims, 7 Drawing Sheets

600 Second UE may determine (600) that a condition indicating that at least one first UE needs a sidelink communication with a second UE is met 602 Second UE may determine (602) to use a first discovery model including broadcasting a discovery announcement to the at least one first UE

(56) References Cited

FOREIGN PATENT DOCUMENTS

| | | | |
|---|---|---|---|
| WO | WO 2021/256908 | A1 | 12/2021 |
| WO | 2022007647 | A | 1/2022 |

OTHER PUBLICATIONS

Gamboa et al. "UE-to-Network Relay Discovery in Pro-Se-enabled LTE Networks", 2020 International Conference on Computing, Networking and Communications (ICNC) Feb. 17-20, 2020.

Prasad et al. "Energy-Efficient D2D Discovery for Proximity Services in 3GPP LTE-Advanced Networks: ProSe Discovery", IEEE Vehicular Technology Magazine, V. 9, N. 4, Dec. 2014.

3GPP Technical Specification 23.303 version 17.0.0, (Dec. 2021) 3rd Generation Partnership Project; Technical Specification Group Services and System Aspects; Proximity-based services (ProSe); Stage 2 (Release 17) in particular Section 5.5.

3GPP Technical Specification 23.304 version 17.1.1, (Jan. 2022) 3rd Generation Partnership Project; Technical Specification Group Services and System Aspects; Proximity based Services (ProSe) in the 5G System (5GS) (Release 17) in particular Sections 5.1.2, 5.1.4, 6.3.2, 6.4.3.

* cited by examiner

APPARATUS, METHOD, AND COMPUTER PROGRAM

FIELD OF THE DISCLOSURE

The present disclosure relates to an apparatus, a method, and a computer program for discovering a relay user equipment in a communication system.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising: means for determining that a condition indicating that at least one first user equipment needs a sidelink communication with a second user equipment is met; and means for determining to use a first discovery model including broadcasting a discovery announcement to the at least one first user equipment.

Determining that the condition indicating that at least one first user equipment needs a sidelink communication with a second user equipment is met may comprise determining that a first timer is running.

The first timer may be started or restarted upon: receiving a request to establish a sidelink connection between the apparatus and at least one first user equipment from the at least one first user equipment; expiring the first timer whilst a sidelink connection is maintained between the apparatus and at least one first user equipment; releasing a sidelink connection between the apparatus and at least one first user equipment; detecting a number of second user equipment using the first model whilst a second timer is running; and receiving a number of discovery solicitations from at least one first user equipment whilst using a second discovery model and whilst a third timer is running.

The second timer may be started upon: detecting a first of second user equipment among the number of second user equipment using the first discovery model.

The third timer may be started upon: receiving a first discovery solicitation among the number of discovery solicitations.

The apparatus may comprise: means for determining that the condition indicating that at least one first user equipment needs a sidelink communication with a second user equipment is no longer met; and means for determining to use a second discovery model including sending a discovery response to at least one first user equipment in response to receiving a relay discovery solicitation from the at least one first user equipment.

The apparatus may comprise: means for adjusting a periodicity and/or timing of discovery announcements based on at least one of: other second user equipment using the first discovery model and/or a periodicity and/or timing of discovery announcements of the other second UEs; and/or a number of discovery announcements per a given time interval broadcast by the apparatus and the other second user equipment.

The periodicity of discovery announcements may be comprised between a minimum periodicity of discovery announcements and a maximum periodicity of discovery announcements.

The apparatus may comprise: means for adjusting a periodicity and/or timing of discovery announcements so that the periodicity of discovery announcements is as large as possible whilst ensuring that a number of discovery announcements per the given time interval broadcast by the apparatus and the other second user equipment is above a discovery announcements threshold.

The apparatus may comprise: means for setting the periodicity of discovery announcements to the minimum periodicity of discovery announcements when the number of other second user equipment using the first discovery model is below a first number of other second user equipment threshold or a number of discovery announcements per the given time interval broadcast by other second user equipment is below a first number of discovery announcements threshold; means for setting the periodicity of discovery announcements to the maximum periodicity of discovery announcements when the number of other second user equipment using the first discovery model is above a second number of other second user equipment threshold or a number of discovery announcements per the given time interval broadcast by other second user equipment is above a second number of discovery announcements per the given time interval threshold; and means for setting the periodicity of discovery announcements between the minimum periodicity of discovery announcements and the maximum periodicity of discovery announcements when the number of other second user equipment using the first discovery model is between the first number of other second user equipment threshold and the second number of other second user equipment threshold or a number of discovery announcements per the given time interval broadcast by other second user equipment is between the first number of discovery announcements per the given time interval threshold and the second number of discovery announcements per the given time interval threshold.

The apparatus may comprise: means for determining that a load of the apparatus is above a load threshold; means for determining to use the second discovery model or means for setting the periodicity of the discovery announcement to the maximum periodicity of discovery announcements.

The apparatus may comprise: means for receiving the condition indicating that at least one first user equipment needs a sidelink communication with a second user equipment from the network.

The apparatus may be a second user equipment.

In an implementation, the second user equipment may be a relay user equipment. The first user equipment may be a remote user equipment.

In the first model a relay user equipment may proactively broadcast relay discovery announcements over sidelink periodically for remote user equipment in proximity. A remote user equipment needing a relay user equipment for a sidelink communication to get network access may monitor relay discovery announcements from relay user equipment in proximity.

In the second model, a remote user equipment needing a relay user equipment for a sidelink communication to get network access may broadcast a relay discovery solicitation over sidelink to relay user equipment in proximity. The remote user equipment may monitor relay discovery responses from relay user equipment in proximity in response to the relay discovery solicitation. A relay user equipment may monitor for relay discovery solicitations from remote user equipment in proximity and determine whether to send a response to the relay discovery solicitation received from the remote user equipment.

In another implementation, the second user equipment may be a user equipment. The first user equipment may be a remote user equipment.

In the first model, the user equipment may proactively broadcast discovery announcements over sidelink periodically for remote user equipment in proximity. A remote user equipment needing a user equipment for a sidelink communication but not to get network access may monitor the discovery announcements from user equipment in proximity.

In the second model, a remote user equipment needing a user equipment for a sidelink communication but not to get network access may broadcast a discovery solicitation over sidelink to relay user equipment in proximity. The remote user equipment may monitor discovery responses from user equipment in proximity in response to the discovery solicitation. A user equipment may monitor for discovery solicitations from remote user equipment in proximity and determine whether to send a response to the discovery solicitation received from the remote user equipment.

According to an aspect there is provided an apparatus comprising at least one processor and at least one memory including computer code for one or more programs, the at least one memory and the computer code configured, with the at least one processor, to cause the apparatus at least to: determine that a condition indicating that at least one first user equipment needs a sidelink communication with a second user equipment is met; and determine to use a first discovery model including broadcasting a discovery announcement to the at least one first user equipment.

Determining that the condition indicating that at least one first user equipment needs a sidelink communication with a second user equipment is met may comprise determining that a first timer is running.

The first timer may be started or restarted upon: receiving a request to establish a sidelink connection between the apparatus and at least one first user equipment from the at least one first user equipment; expiring the first timer whilst a sidelink connection is maintained between the apparatus and at least one first user equipment; releasing a sidelink connection between the apparatus and at least one first user equipment; detecting a number of second user equipment using the first model whilst a second timer is running; and receiving a number of discovery solicitations from at least one first user equipment whilst using a second discovery model and whilst a third timer is running.

The second timer may be started upon: detecting a first of second user equipment among the number of second user equipment using the first discovery model.

The third timer may be started upon: receiving a first discovery solicitation among the number of discovery solicitations.

The at least one memory and the computer code may be configured, with the at least one processor, to cause the apparatus at least to: determine that the condition indicating that at least one first user equipment needs a sidelink communication with a second user equipment is no longer met; and determine to use a second discovery model including sending a discovery response to at least one first user equipment in response to receiving a relay discovery solicitation from the at least one first user equipment.

The at least one memory and the computer code may be configured, with the at least one processor, to cause the apparatus at least to: adjust a periodicity and/or timing of discovery announcements based on at least one of: other second user equipment using the first discovery model and/or a periodicity and/or timing of discovery announcements of the other second UEs; and/or a number of discovery announcements per a given time interval broadcast by the apparatus and the other second user equipment.

The periodicity of discovery announcements may be comprised between a minimum periodicity of discovery announcements and a maximum periodicity of discovery announcements.

The at least one memory and the computer code may be configured, with the at least one processor, to cause the apparatus at least to: adjust a periodicity and/or timing of discovery announcements so that the periodicity of discovery announcements is as large as possible whilst ensuring that a number of discovery announcements per the given time interval broadcast by the apparatus and the other second user equipment is above a discovery announcements threshold.

The at least one memory and the computer code may be configured, with the at least one processor, to cause the apparatus at least to: set the periodicity of discovery announcements to the minimum periodicity of discovery announcements when the number of other second user equipment using the first discovery model is below a first number of other second user equipment threshold or a number of discovery announcements per the given time interval broadcast by other second user equipment is below a first number of discovery announcements threshold; set the periodicity of discovery announcements to the maximum periodicity of discovery announcements when the number of other second user equipment using the first discovery model is above a second number of other second user equipment threshold or a number of discovery announcements per the given time interval broadcast by other second user equipment is above a second number of discovery announcements per the given time interval threshold; and set the periodicity of discovery announcements between the minimum periodicity of discovery announcements and the maximum periodicity of discovery announcements when the number of other second user equipment using the first discovery model is between the first number of other second user equipment threshold and the second number of other second user equipment threshold or a number of discovery announcements per the given time interval broadcast by other second user equipment is between the first number of discovery announcements per the given time interval threshold and the second number of discovery announcements per the given time interval threshold.

The at least one memory and the computer code may be configured, with the at least one processor, to cause the apparatus at least to: determine that a load of the apparatus is above a load threshold; determine to use the second discovery model or means for setting the periodicity of the discovery announcement to the maximum periodicity of discovery announcements.

The at least one memory and the computer code may be configured, with the at least one processor, to cause the apparatus at least to: receive the condition indicating that at least one first user equipment needs a sidelink communication with a second user equipment from the network.

The apparatus may be a second user equipment.

In an implementation, the second user equipment may be a relay user equipment. The first user equipment may be a remote user equipment.

In the first model a relay user equipment may proactively broadcast relay discovery announcements over sidelink periodically for remote user equipment in proximity. A remote user equipment needing a relay user equipment for a sidelink communication to get network access may monitor relay discovery announcements from relay user equipment in proximity.

In the second model, a remote user equipment needing a relay user equipment for a sidelink communication to get network access may broadcast a relay discovery solicitation over sidelink to relay user equipment in proximity. The remote user equipment may monitor relay discovery responses from relay user equipment in proximity in response to the relay discovery solicitation. A relay user equipment may monitor for relay discovery solicitations from remote user equipment in proximity and determine whether to send a response to the relay discovery solicitation received from the remote user equipment.

In another implementation, the second user equipment may be a user equipment. The first user equipment may be a remote user equipment.

In the first model, the user equipment may proactively broadcast discovery announcements over sidelink periodically for remote user equipment in proximity. A remote user equipment needing a user equipment for a sidelink communication but not to get network access may monitor the discovery announcements from user equipment in proximity.

In the second model, a remote user equipment needing a user equipment for a sidelink communication but not to get network access may broadcast a discovery solicitation over sidelink to relay user equipment in proximity. The remote user equipment may monitor discovery responses from user equipment in proximity in response to the discovery solicitation. A user equipment may monitor for discovery solicitations from remote user equipment in proximity and determine whether to send a response to the discovery solicitation received from the remote user equipment.

According to an aspect there is provided an apparatus comprising circuitry configured to: determine that a condition indicating that at least one first user equipment needs a sidelink communication with a second user equipment is met; and determine to use a first discovery model including broadcasting a discovery announcement to the at least one first user equipment.

Determining that the condition indicating that at least one first user equipment needs a sidelink communication with a second user equipment is met may comprise determining that a first timer is running.

The first timer may be started or restarted upon: receiving a request to establish a sidelink connection between the apparatus and at least one first user equipment from the at least one first user equipment; expiring the first timer whilst a sidelink connection is maintained between the apparatus and at least one first user equipment; releasing a sidelink connection between the apparatus and at least one first user equipment; detecting a number of second user equipment using the first model whilst a second timer is running; and receiving a number of discovery solicitations from at least one first user equipment whilst using a second discovery model and whilst a third timer is running.

The second timer may be started upon: detecting a first of second user equipment among the number of second user equipment using the first discovery model.

The third timer may be started upon: receiving a first discovery solicitation among the number of discovery solicitations.

The circuitry may be configured to: determine that the condition indicating that at least one first user equipment needs a sidelink communication with a second user equipment is no longer met; and determine to use a second discovery model including sending a discovery response to at least one first user equipment in response to receiving a relay discovery solicitation from the at least one first user equipment.

The circuitry may be configured to: adjust a periodicity and/or timing of discovery announcements based on at least one of: other second user equipment using the first discovery model and/or a periodicity and/or timing of discovery announcements of the other second UEs; and/or a number of discovery announcements per a given time interval broadcast by the apparatus and the other second user equipment.

The periodicity of discovery announcements may be comprised between a minimum periodicity of discovery announcements and a maximum periodicity of discovery announcements.

The circuitry may be configured to: adjust a periodicity and/or timing of discovery announcements so that the periodicity of discovery announcements is as large as possible whilst ensuring that a number of discovery announcements per the given time interval broadcast by the apparatus and the other second user equipment is above a discovery announcements threshold.

The circuitry may be configured to: set the periodicity of discovery announcements to the minimum periodicity of discovery announcements when the number of other second user equipment using the first discovery model is below a first number of other second user equipment threshold or a number of discovery announcements per the given time interval broadcast by other second user equipment is below a first number of discovery announcements threshold; set the periodicity of discovery announcements to the maximum periodicity of discovery announcements when the number of other second user equipment using the first discovery model is above a second number of other second user equipment threshold or a number of discovery announcements per the given time interval broadcast by other second user equipment is above a second number of discovery announcements per the given time interval threshold; and set the periodicity of discovery announcements between the minimum periodicity of discovery announcements and the maximum periodicity of discovery announcements when the number of other second user equipment using the first discovery model is between the first number of other second user equipment threshold and the second number of other second user equipment threshold or a number of discovery announcements per the given time interval broadcast by other second user equipment is between the first number of discovery announcements per the given time interval threshold and the second number of discovery announcements per the given time interval threshold.

The circuitry may be configured to: determine that a load of the apparatus is above a load threshold; determine to use the second discovery model or means for setting the periodicity of the discovery announcement to the maximum periodicity of discovery announcements.

The circuitry may be configured to: receive the condition indicating that at least one first user equipment needs a sidelink communication with a second user equipment from the network.

The apparatus may be a second user equipment.

In an implementation, the second user equipment may be a relay user equipment. The first user equipment may be a remote user equipment.

In the first model a relay user equipment may proactively broadcast relay discovery announcements over sidelink periodically for remote user equipment in proximity. A remote user equipment needing a relay user equipment for a sidelink communication to get network access may monitor relay discovery announcements from relay user equipment in proximity.

In the second model, a remote user equipment needing a relay user equipment for a sidelink communication to get network access may broadcast a relay discovery solicitation over sidelink to relay user equipment in proximity. The remote user equipment may monitor relay discovery responses from relay user equipment in proximity in response to the relay discovery solicitation. A relay user equipment may monitor for relay discovery solicitations from remote user equipment in proximity and determine whether to send a response to the relay discovery solicitation received from the remote user equipment.

In another implementation, the second user equipment may be a user equipment. The first user equipment may be a remote user equipment.

In the first model, the user equipment may proactively broadcast discovery announcements over sidelink periodically for remote user equipment in proximity. A remote user equipment needing a user equipment for a sidelink communication but not to get network access may monitor the discovery announcements from user equipment in proximity.

In the second model, a remote user equipment needing a user equipment for a sidelink communication but not to get network access may broadcast a discovery solicitation over sidelink to relay user equipment in proximity. The remote user equipment may monitor discovery responses from user equipment in proximity in response to the discovery solicitation. A user equipment may monitor for discovery solicitations from remote user equipment in proximity and determine whether to send a response to the discovery solicitation received from the remote user equipment.

According to an aspect there is provided a method comprising: determining that a condition indicating that at least one first user equipment needs a sidelink communication with a second user equipment is met; and determining to use a first discovery model including broadcasting a discovery announcement to the at least one first user equipment.

The method may be performed by an apparatus.

Determining that the condition indicating that at least one first user equipment needs a sidelink communication with a second user equipment is met may comprise determining that a first timer is running.

The first timer may be started or restarted upon: receiving a request to establish a sidelink connection between the apparatus and at least one first user equipment from the at least one first user equipment; expiring the first timer whilst a sidelink connection is maintained between the apparatus and at least one first user equipment; releasing a sidelink connection between the apparatus and at least one first user equipment; detecting a number of second user equipment using the first model whilst a second timer is running; and receiving a number of discovery solicitations from at least one first user equipment whilst using a second discovery model and whilst a third timer is running.

The second timer may be started upon: detecting a first of second user equipment among the number of second user equipment using the first discovery model.

The third timer may be started upon: receiving a first discovery solicitation among the number of discovery solicitations.

The method may comprise: determining that the condition indicating that at least one first user equipment needs a sidelink communication with a second user equipment is no longer met; and determining to use a second discovery model including sending a discovery response to at least one first user equipment in response to receiving a relay discovery solicitation from the at least one first user equipment.

The method may comprise: adjusting a periodicity and/or timing of discovery announcements based on at least one of: other second user equipment using the first discovery model and/or a periodicity and/or timing of discovery announcements of the other second UEs; and/or a number of discovery announcements per a given time interval broadcast by the apparatus and the other second user equipment.

The periodicity of discovery announcements may be comprised between a minimum periodicity of discovery announcements and a maximum periodicity of discovery announcements.

The method may comprise: adjusting a periodicity and/or timing of discovery announcements so that the periodicity of discovery announcements is as large as possible whilst ensuring that a number of discovery announcements per the given time interval broadcast by the apparatus and the other second user equipment is above a discovery announcements threshold.

The method may comprise: setting the periodicity of discovery announcements to the minimum periodicity of discovery announcements when the number of other second user equipment using the first discovery model is below a first number of other second user equipment threshold or a number of discovery announcements per the given time interval broadcast by other second user equipment is below a first number of discovery announcements threshold; setting the periodicity of discovery announcements to the maximum periodicity of discovery announcements when the number of other second user equipment using the first discovery model is above a second number of other second user equipment threshold or a number of discovery announcements per the given time interval broadcast by other second user equipment is above a second number of discovery announcements per the given time interval threshold; and setting the periodicity of discovery announcements between the minimum periodicity of discovery announcements and the maximum periodicity of discovery announcements when the number of other second user equipment using the first discovery model is between the first number of other second user equipment threshold and the second number of other second user equipment threshold or a number of discovery announcements per the given time interval broadcast by other second user equipment is between the first number of discovery announcements per the given time interval threshold and the second number of discovery announcements per the given time interval threshold.

The method may comprise: determining that a load of the apparatus is above a load threshold; determining to use the second discovery model or means for setting the periodicity of the discovery announcement to the maximum periodicity of discovery announcements.

The method may comprise: receiving the condition indicating that at least one first user equipment needs a sidelink communication with a second user equipment from the network.

The apparatus may be a second user equipment.

In an implementation, the second user equipment may be a relay user equipment. The first user equipment may be a remote user equipment.

In the first model a relay user equipment may proactively broadcast relay discovery announcements over sidelink periodically for remote user equipment in proximity. A remote user equipment needing a relay user equipment for a sidelink communication to get network access may monitor relay discovery announcements from relay user equipment in proximity.

In the second model, a remote user equipment needing a relay user equipment for a sidelink communication to get network access may broadcast a relay discovery solicitation over sidelink to relay user equipment in proximity. The remote user equipment may monitor relay discovery responses from relay user equipment in proximity in response to the relay discovery solicitation. A relay user equipment may monitor for relay discovery solicitations from remote user equipment in proximity and determine whether to send a response to the relay discovery solicitation received from the remote user equipment.

In another implementation, the second user equipment may be a user equipment. The first user equipment may be a remote user equipment.

In the first model, the user equipment may proactively broadcast discovery announcements over sidelink periodically for remote user equipment in proximity. A remote user equipment needing a user equipment for a sidelink communication but not to get network access may monitor the discovery announcements from user equipment in proximity.

In the second model, a remote user equipment needing a user equipment for a sidelink communication but not to get network access may broadcast a discovery solicitation over sidelink to relay user equipment in proximity. The remote user equipment may monitor discovery responses from user equipment in proximity in response to the discovery solicitation. A user equipment may monitor for discovery solicitations from remote user equipment in proximity and determine whether to send a response to the discovery solicitation received from the remote user equipment.

According to an aspect there is provided a computer program comprising computer executable code which when run on at least one processor is configured to: determine that a condition indicating that at least one first user equipment needs a sidelink communication with a second user equipment is met; and determine to use a first discovery model including broadcasting a discovery announcement to the at least one first user equipment.

The processor may be part of an apparatus.

Determining that the condition indicating that at least one first user equipment needs a sidelink communication with a second user equipment is met may comprise determining that a first timer is running.

The first timer may be started or restarted upon: receiving a request to establish a sidelink connection between the apparatus and at least one first user equipment from the at least one first user equipment; expiring the first timer whilst a sidelink connection is maintained between the apparatus and at least one first user equipment; releasing a sidelink connection between the apparatus and at least one first user equipment; detecting a number of second user equipment using the first model whilst a second timer is running; and receiving a number of discovery solicitations from at least one first user equipment whilst using a second discovery model and whilst a third timer is running.

The second timer may be started upon: detecting a first of second user equipment among the number of second user equipment using the first discovery model.

The third timer may be started upon: receiving a first discovery solicitation among the number of discovery solicitations.

The computer program may comprise computer executable code which when run on at least one processor is configured to: determine that the condition indicating that at least one first user equipment needs a sidelink communication with a second user equipment is no longer met; and determine to use a second discovery model including sending a discovery response to at least one first user equipment in response to receiving a relay discovery solicitation from the at least one first user equipment.

The computer program may comprise computer executable code which when run on at least one processor is configured to: adjust a periodicity and/or timing of discovery announcements based on at least one of: other second user equipment using the first discovery model and/or a periodicity and/or timing of discovery announcements of the other second UEs; and/or a number of discovery announcements per a given time interval broadcast by the apparatus and the other second user equipment.

The periodicity of discovery announcements may be comprised between a minimum periodicity of discovery announcements and a maximum periodicity of discovery announcements.

The computer program may comprise computer executable code which when run on at least one processor is configured to: adjust a periodicity and/or timing of discovery announcements so that the periodicity of discovery announcements is as large as possible whilst ensuring that a number of discovery announcements per the given time interval broadcast by the apparatus and the other second user equipment is above a discovery announcements threshold.

The computer program may comprise computer executable code which when run on at least one processor is configured to: set the periodicity of discovery announcements to the minimum periodicity of discovery announcements when the number of other second user equipment using the first discovery model is below a first number of other second user equipment threshold or a number of discovery announcements per the given time interval broadcast by other second user equipment is below a first number of discovery announcements threshold; set the periodicity of discovery announcements to the maximum periodicity of discovery announcements when the number of other second user equipment using the first discovery model is above a second number of other second user equipment threshold or a number of discovery announcements per the given time interval broadcast by other second user equipment is above a second number of discovery announcements per the given time interval threshold; and set the periodicity of discovery announcements between the minimum periodicity of discovery announcements and the maximum periodicity of discovery announcements when the number of other second user equipment using the first discovery model is between the first number of other second user equipment threshold and the second number of other second user equipment threshold or a number of discovery announcements per the given time interval broadcast by other second user equipment is between the first number of discovery announcements per the given time interval threshold and the second number of discovery announcements per the given time interval threshold.

The computer program may comprise computer executable code which when run on at least one processor is configured to: determine that a load of the apparatus is above a load threshold; determine to use the second discovery model or means for setting the periodicity of the discovery announcement to the maximum periodicity of discovery announcements.

The computer program may comprise computer executable code which when run on at least one processor is configured to: receive the condition indicating that at least one first user equipment needs a sidelink communication with a second user equipment from the network.

The Apparatus May be a Second User Equipment

In an implementation, the second user equipment may be a relay user equipment. The first user equipment may be a remote user equipment.

In the first model a relay user equipment may proactively broadcast relay discovery announcements over sidelink periodically for remote user equipment in proximity. A remote user equipment needing a relay user equipment for a sidelink communication to get network access may monitor relay discovery announcements from relay user equipment in proximity.

In the second model, a remote user equipment needing a relay user equipment for a sidelink communication to get network access may broadcast a relay discovery solicitation over sidelink to relay user equipment in proximity. The remote user equipment may monitor relay discovery responses from relay user equipment in proximity in response to the relay discovery solicitation. A relay user equipment may monitor for relay discovery solicitations from remote user equipment in proximity and determine whether to send a response to the relay discovery solicitation received from the remote user equipment.

In another implementation, the second user equipment may be a user equipment. The first user equipment may be a remote user equipment.

In the first model, the user equipment may proactively broadcast discovery announcements over sidelink periodically for remote user equipment in proximity. A remote user equipment needing a user equipment for a sidelink communication but not to get network access may monitor the discovery announcements from user equipment in proximity.

In the second model, a remote user equipment needing a user equipment for a sidelink communication but not to get network access may broadcast a discovery solicitation over sidelink to relay user equipment in proximity. The remote user equipment may monitor discovery responses from user equipment in proximity in response to the discovery solicitation. A user equipment may monitor for discovery solicitations from remote user equipment in proximity and determine whether to send a response to the discovery solicitation received from the remote user equipment.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AMF: Access and Mobility Management Function
API: Application Programming Interface
BS: Base Station
CU: Centralized Unit
DL: Downlink
DU: Distributed Unit
EPC: Evolved Packet core
gNB: gNodeB
GSM: Global System for Mobile communication
HSS: Home Subscriber Server
IoT: Internet of Things
LTE: Long Term Evolution
MAC: Medium Access Control
MIB: Master Information Block
so MS: Mobile Station
MTC: Machine Type Communication
NEF: Network Exposure Function
NF: Network Function
NR: New radio
NRF: Network Repository Function
PDU: Packet Data Unit
PLMN: Public Land Mobile Network
ProSe: Proximity Service
RAM: Random Access Memory
(R)AN: (Radio) Access Network
RD: Relay Discover
ROM: Read Only Memory
SIB: System Information Block
SL: Sidelink
SMF: Session Management Function
TR: Technical Report
TS: Technical Specification
U2N: User equipment to Network
UE: User Equipment
UMTS: Universal Mobile Telecommunication System
WLAN: Wireless Local Area Network
3GPP: 3$^{rd}$ Generation Partnership Project
5G: 5th Generation
5GC: 5G Core network
5GS: 5G System

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
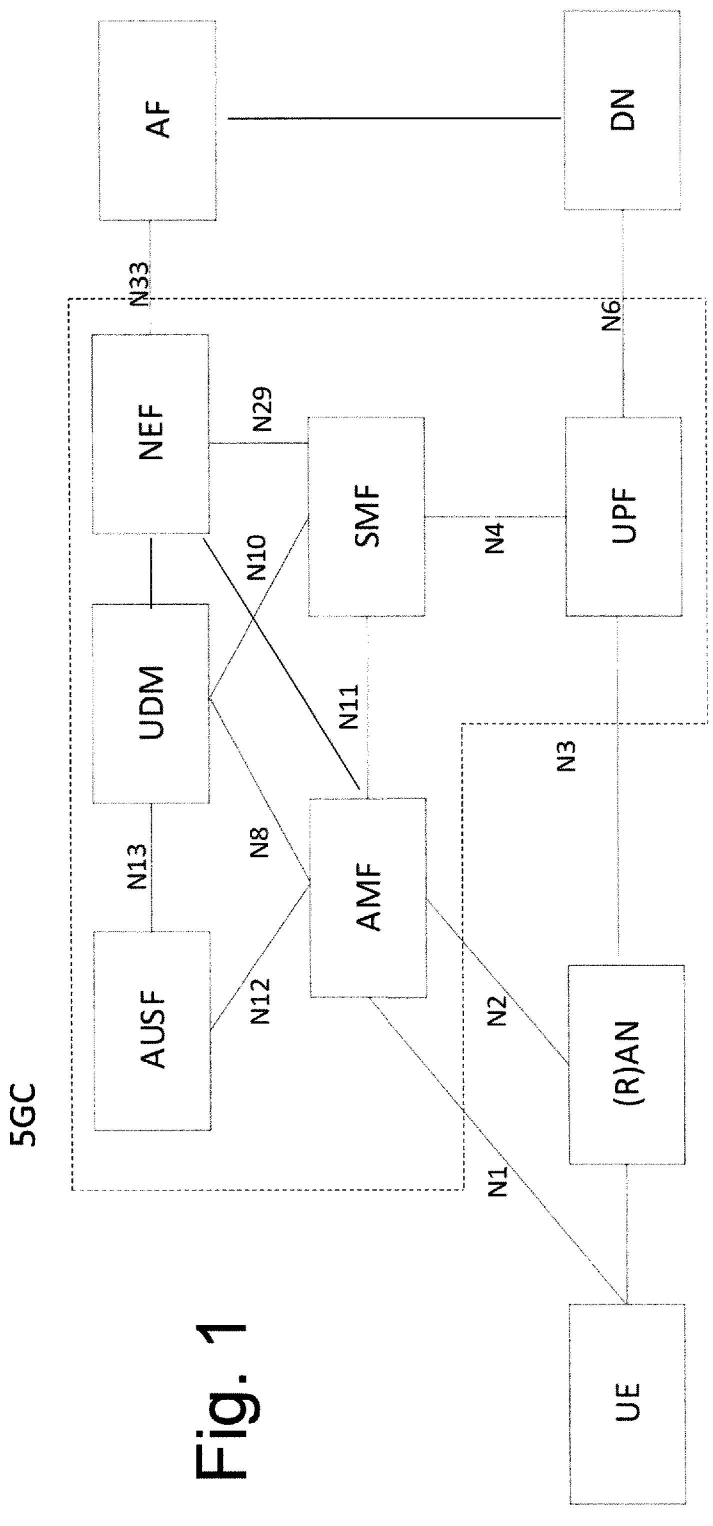
FIG. 1 shows a schematic representation of a 5G system.

FIG. 1 shows a schematic representation of a 5G system (5GS). The 5GS may comprises a user equipment (UE), a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF).

Figure 2:
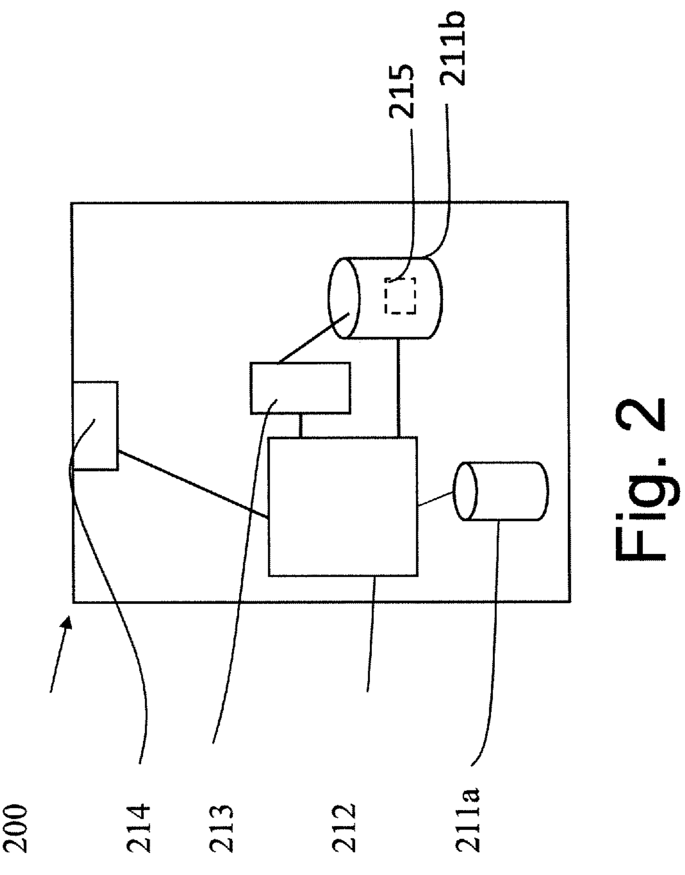
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
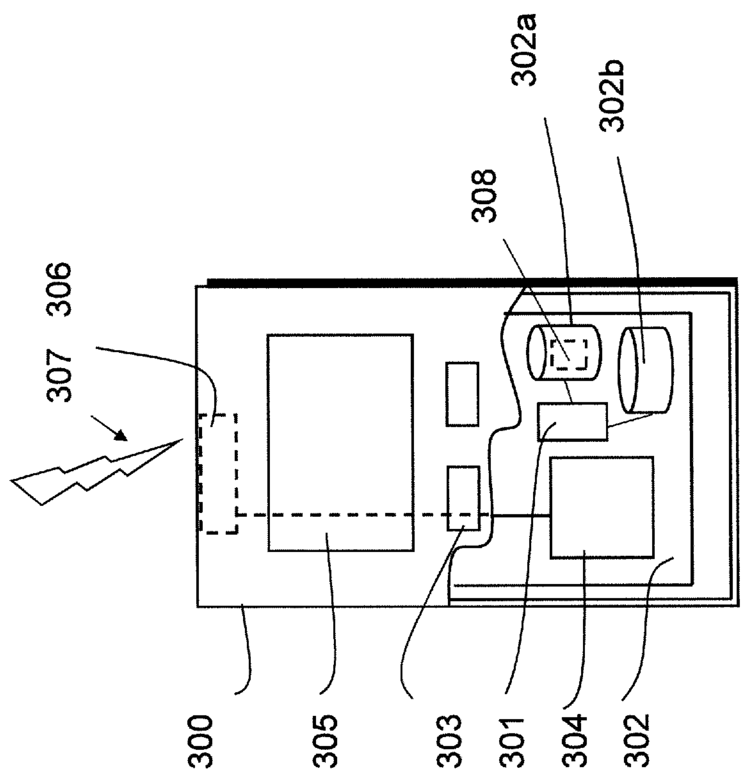
FIG. 3 shows a schematic representation of a user equipment.

FIG. 3 illustrates an example of a UE 300, such as the UE illustrated on FIG. 1. The UE 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The UE 300 may provide, for example, communication of data for carrying communications. The communications may be one or more of voice, electronic mail (email), text message, multimedia, data, machine data and so on.

The UE 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The UE 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more aspects of this disclosure relate to relay discovery (RD) in 3GPP Release 17 sidelink (SL) based UE-to-network (U2N) relays.

RD in Release 17 SL based U2N relays may be based on either Model A or Model B. Model A or Model B may be defined in 3GPP TS 23.303 and TS 23.304.

Figure 4:
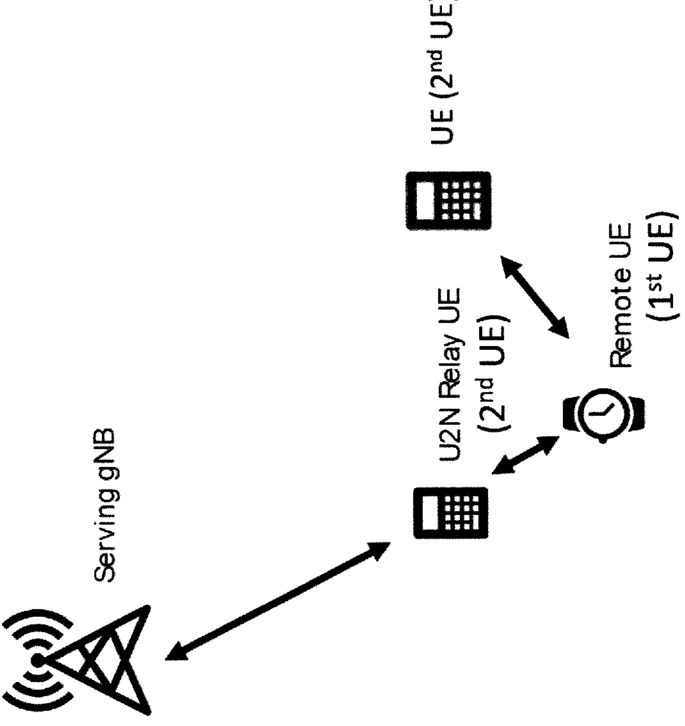
FIG. 4 shows a schematic representation of a communication system comprising a gNode B, a relay user equipment, a user equipment and a remote user equipment.

FIG. 4 shows a schematic representation of a communication system comprising a gNode B, a relay UE, a UE and a remote UE.

A relay UE may use two models.

In Model A, a relay UE may proactively broadcast RD announcements over SL periodically for remote UEs in proximity. A remote UE needing a relay UE for a SL communication to get network access may monitor RD announcements from relay UEs in proximity.

In Model B, a remote UE needing a relay UE for a SL communication to get network access may broadcast a RD solicitation over SL to relay UEs in proximity. The remote UE may monitor RD responses from relay UEs in proximity in response to the RD solicitation. A relay UE may monitor for RD solicitations from remote UEs in proximity and determine whether to send a response to the RD solicitation received from the remote UE.

A UE may use two models.

In a Model, a UE may proactively broadcast discovery announcements over SL periodically for remote UEs in proximity. A remote UE needing a UE for a SL communication but not to get network access may monitor the discovery announcements from UEs in proximity.

In another Model, a remote UE needing a UE for a SL communication but not to get network access may broadcast a discovery solicitation over SL to relay UEs in proximity. The remote UE may monitor discovery responses from UEs in proximity in response to the discovery solicitation. A UE may monitor for discovery solicitations from remote UEs in proximity and determine whether to send a response to the discovery solicitation received from the remote UE.

RD messages may include RD announcement in Model A or RD solicitation and response to RD solicitation in Model B. RD messages may be transmitted as SL data using resources from a configured resource pool.

It may be expected that RD messages from a relay UE may contain certain system information block (SIB) elements of the serving cell of the relay UE, such as master information block (MIB) flags, parts of SIB1, public land mobile network (PLMN) information or other.

MIB (Master Information Block) and SIB1 (System Information Block Type #1) may refer to the basic or minimum broadcast system information of a cell (e.g. in 3GPP LTE and NR systems) required for initial access (e.g. cell selection and reselection) and for acquiring other SIB #. A UE may get at least MIB and SIB1 of a cell in order to be allowed to camp on the cell.

Questions on how and when to use Model A and Model B and when Model A is used how often and with what kind of timing a relay UE needs to broadcast RD announcement have not been discussed so far in 3GPP and therefore are considered in this disclosure. These questions may be left for UE implementations in 3GPP Release 17.

On the one hand, RD using Model A may be seen as similar to a cell search. In order to enable fast and robust RD a relay UE may need to broadcast RD announcements frequently (e.g. as frequently as MIB and SIB1). However, the more frequent the RD announcements are broadcasted, the greater the protocol overhead of RD is. Considering that there may be no remote UE in proximity, broadcasting the RD announcements may be a waste of resources. Moreover, the more frequent the RD announcements are broadcasted, the greater the power consumption of the relay UE is. The protocol overhead is scaled with the number of relay UEs.

On the other hand, RD using Model B may be initiated by a remote UE by sending a RD solicitation on a need basis and the relay UE, instead of having to broadcast the RD announcement rather frequently as in Model A, may need to monitor RD solicitations and may send a response to the RD solicitation received from the remote UE, if the relay UE determines to respond. The success of the RD is therefore conditioned to not only that the RD solicitations are transmitted and received successfully but also the decision at the relay UE whether to respond to a received RD solicitation or not. The remote UE may need to send multiple RD solicitations in order to discover as many relay UEs in proximity as possible for a robust operation, prolonging delay of the RD process. Thus, the use of Model B may have some negative impact in term of latency which may not be preferred in support of service continuity for the remote UE that needs a relay UE to get network access.

One or more aspects of this disclosure provide answers to the above questions.

One or more aspects of this disclosure provide reduction of the protocol overhead with Model A while not compromising RD performance in term of latency for service continuity support with Model B.

Evolved packet core (EPC) level proximity service (ProSe) discovery procedure as specified in clause 5.5 of 3GPP TS 23.303 may be considered. In that procedure UEs may discover with the help of EPC that they are in proximity and may try to communicate directly with each other. The procedure was primarily developed for WLAN direct discovery, but may be used with 3GPP sidelink technology by changing the last step.

In FIG. 4, the remote UE is also referred to as the $1^{st}$ UE and the relay UE and the UE which may have a sidelink communication with the remote UE are also referred to as the $2^{nd}$ UE. In general, the first UE can be a remote UE in U2N relay, a peer UE in a direct one-hop UE-to-UE (U2U) sidelink communication, or a source UE or a target UE in a multi-hop U2U relay based sidelink communication via one or more U2U relay UE(s) (not shown in FIG. 4) for examples. The second UE can be a relay UE in U2N relay, a peer UE in direct one-hop U2U sidelink communication, or a U2U relay UE in a multi-hop U2U relay based sidelink communication (not shown in FIG. 4) for examples. Thus, the sidelink communication between a first UE and a second UE can be used for getting network access, or one-hop or multi-hop U2U communication for examples.

Figure 5:
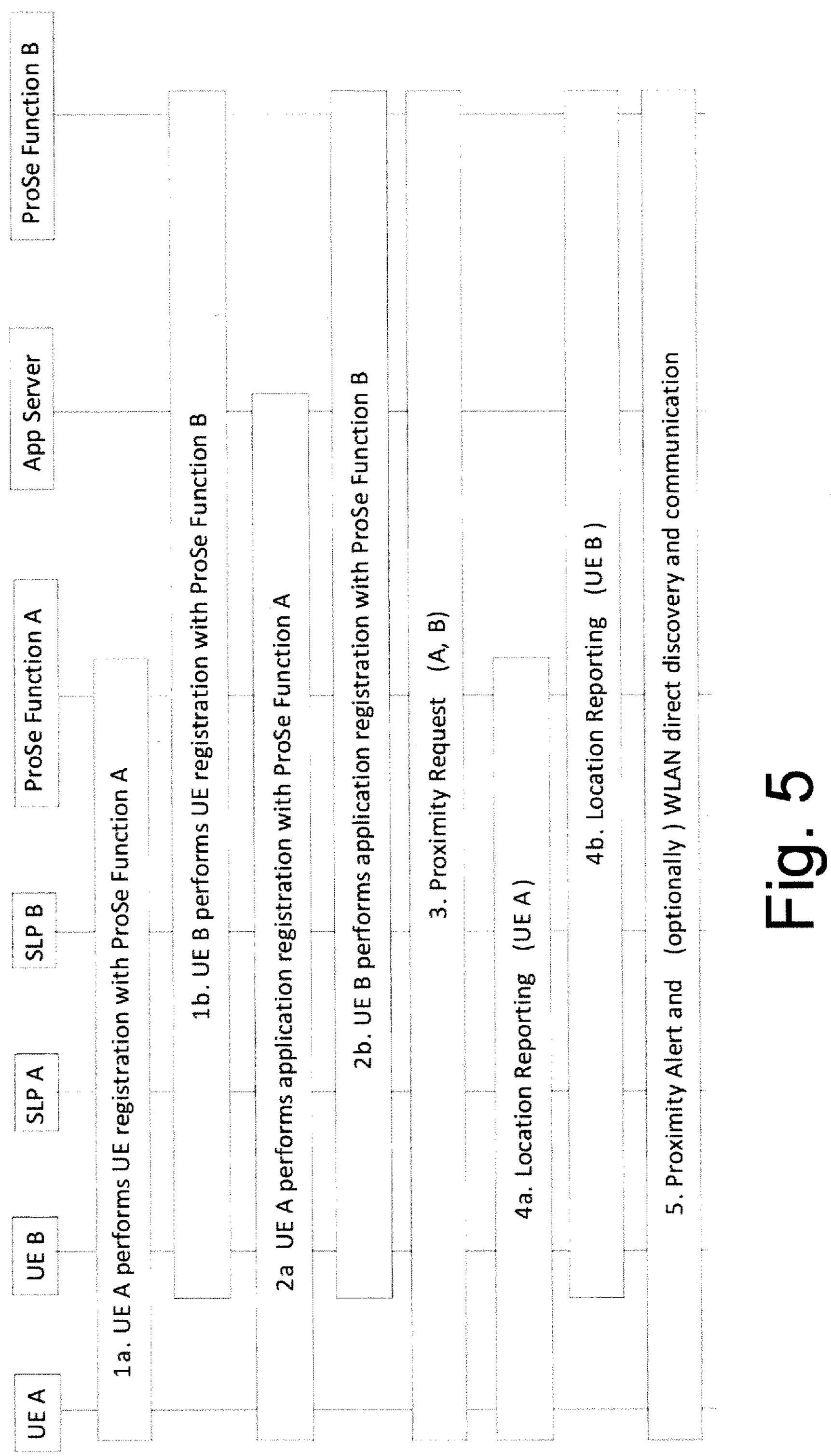
FIG. 5 shows an overall call flow for EPC-level ProSe Discovery and optional EPC support for WLAN direct discovery and communication (FIG. 5.5.2-1 of 3GPP TS 23.303)

FIG. 5 shows an overall call flow for EPC-level ProSe Discovery and optional EPC support for WLAN direct discovery and communication (FIG. 5.5.2-1 of 3GPP TS 23.303).

In step 1 UEs may perform UE registration for ProSe with the ProSe Function residing in their respective Home PLMNs.

In step 2 UEs may perform application registration for ProSe with the ProSe Function residing in their respective Home PLMNs.

In step 3 UE A may make a proximity request for UE B, that is requests that UE A be alerted of proximity with UE B (possibly indicating a window of time during which the request is valid). In response, ProSe Function A requests location updates for UE A and UE B. These location updates can be periodic, based on a trigger, or a combination of both. To request location updates for UE A, ProSe Function A contacts secure user plane location (SUPL) Location Platform (SLP) A. To request location updates for UE B, ProSe Function A may contact ProSe Function B, which requests location updates for UE B from SLP B.

In step 4 the UEs' locations may be reported to their respective ProSe Functions intermittently. ProSe Function B may forward UE B's location updates to ProSe Function A based on the conditions set by ProSe Function A. Whenever ProSe Function A receives location updates for UE A and/or UE B, it may perform proximity analysis on UE A and UE B's locations.

In step 5 when ProSe Function A detects that the UEs are in proximity, it may inform UE A that UE B is in proximity and (optionally) provides UE A with assistance information for WLAN direct discovery and communication with UE B. ProSe Function A may also inform ProSe Function B, which in turn may inform UE B of the detected proximity and (optionally) provides UE B with assistance information for WLAN direct discovery and communication with UE A.

It may be noted that the discovery procedures specified in TS 23.304 (e.g. clause 6.3) do not specify similar procedure in 5GS for NR SL.

A high-level idea behind this disclosure is that a relay UE may optimise both signalling efficiency and its power consumption by adapting its use of discovery Model A and discovery Model B based on expected remote UEs in proximity needing to get network access. This expectation may be based at least in part on a timer. The timer may be triggered by observation of certain protocol events by the relay UE. When using Model A, the relay UE may adjust its RD announcement broadcast periodicity and/or timing over time. This adjustment of RD announcement broadcast periodicity and/or timing may depend on the timer.

When a relay UE is available for relay (re)selection, the relay UE may use Model A when the relay UE determines that there may be one or more remote UEs in proximity in need to get network access via a relay UE. Otherwise, the relay UE may use Model B. Then, when Model A is used, the relay UE may adjust the RD announcement broadcast periodicity and/or timing based on a detection of one or more other relay UEs in proximity.

The following criteria or conditions may be used by a relay UE to determine which of Model A and Model B to use and how it is to be used when the relay UE is available for relay (re)selection.

The relay UE may use Model A while a timer T1 is running.

The timer T1 may be (re)started if the relay UE is selected by at least one remote UE. T1 may be (re)started upon receiving a PC5 connection request from a remote UE to get network access via the relay UE.

The timer T1 may be (re)started if the relay UE is serving at least one remote UE. The timer T1 may be kept running (restarted right after expiring) as long as the PC5 connection for the at least one remote UE is maintained by the relay UE.

The timer T1 may be (re)started if the PC5 connection of the last one remote UE is released.

The timer T1 may be (re)started if the relay UE detects at least a predefined number M of other relay UEs using Model A in proximity whilst a timer T2 is running. M may be equal to or greater than 1. The timer T2 may be (re)started upon detecting the first of the M other relay UE using Model A in proximity. The detection may be based on a source identifier (ID) and/or a destination ID indicated in a second stage sidelink control information (SCI) of the received SCI for the RD announcement. This may be based on the assumption that a destination ID may be specific to the model and in this case all the RD announcements in Model A are transmitted (broadcast) using the same destination ID exclusive for Model A. Thus, as soon as the M other relay UEs using Model A are detected whilst the timer T2 is running, the relay UE may (re)starts the timer T1 and may use Model A. The reason behind this may be that the detection of the M other relay UEs using Model A in proximity may imply that there may be remote UEs in proximity of the M other relay UEs using Model A. This proximity may overlap with the proximity of the relay UE and therefore the likelihood that remote UEs are in or moving toward the proximity of the relay UE may be high.

3GPP TS 38. 212 specifies the detailed content of SCI. SL communication specified in 3GPP is based on transmitter (Tx UE) oriented one-to-many broadcast principle in which receiver (Rx UE) needs to monitor over one or more resource pools configured for SL reception, regardless of whether SL transmission is for unicast, groupcast or broadcast. IDs of Tx UE, referred to as source ID (SRC ID), and the receiver, referred to as destination ID (DST ID), are in part included in SL control information (SCI) sent by Tx UE to schedule for a SL transmission of a transport block (TB) and in part included in the header of MAC PDU inside the TB. Rx UE may need to monitor at least all SCIs over configured resource pools in order to receive the TB addressed to Rx UE (filtered based on the received DST ID).

SCI for NR SL transmission is sent in two stages: the first stage SCI may be sent in PSCCH and the second stage SCI may be sent in PSSCH together with the TB.

The timer T1 may be (re)started if the relay UE using Model B receives at least a predefined number N of RD solicitations from remote UEs in proximity whilst a timer T3 is running. N may be equal to or greater than 1. The timer T3 may be (re)started upon receiving the first of the N RD solicitations. That is, as soon as N RD solicitations are received whilst the timer T3 is running, the relay UE may (re)starts the timer T1 and may use Model A. N may be set to 1 and in this case the timer T3 may be set to 0.

The timer T1 may be (re)started if any other appropriate condition indicating that there may be at least one remote UE that needs to get network access via a relay UE (i.e. indicating that there may be at least one remote UE attempting to discover the relay UE in proximity).

The relay UE may use Model B when the timer T1 expires.

The relay UE when using Model A may adjust the periodicity and/or timing for broadcasting the RD announcements based on the value of the timer T1. For example, when the value of the timer T1 is larger than half of the starting value of the timer T1, then the relay UE may broadcast the RD announcements more frequently compared to when the value of the timer T1 is smaller than half of the starting value of the timer T1.

The relay UE when using Model A may adjust the periodicity and/or timing for broadcasting the RD announcements based on a detection of other relay UEs using Model A in proximity.

The detection may comprise the detection of at least a predefined number M of other relay UEs using Model A in proximity whilst the timer T2 is running as discussed above The detection may comprise the detection of the periodicity and/or timing of RD announcements broadcasted by the other relay UEs in proximity. The detection may be based on a resource reservation period indicated in a first stage SCI and/or a timing of the received SCIs for the RD announcements of the other relay UEs. The resource reservation period indicated in the first stage SCI for the RD announcement may indicates the periodicity of the RD announcements.

A predefined set of values between a minimum periodicity T-min and a maximum periodicity T-max may be configured for the relay UE to select from.

The relay UE, based on the detection, may determine the periodicity and/or timing for broadcasting RD announcements. The periodicity for broadcasting RD announcements may be as large as possible while ensuring that the overall distribution of the RD announcements in proximity is above a predefined level (e.g. at least one RD announcement per T-min).

The periodicity for broadcasting RD announcements may be set to the minimum periodicity T-min if the detected number of the other relay UEs is below a first corresponding number of other relay UEs threshold M1 or the overall distribution of the RD announcements in proximity is below a first corresponding overall distribution of the RD announcements threshold D1. In this case, the timing for broadcasting the RD announcements may be on any available resources.

The relay UE, may transmit the RD announcements for example on the first available resources which can be selected by the relay UE in case the autonomous resource allocation mode (mode 2) is used or which are allocated by a serving gNB in case the network-scheduled resource allocation mode (mode 1) is used. Thus, the timing for broadcast the RD announcements may not necessarily be in a fixed time slot or subframe.

The periodicity for broadcasting RD announcements may be set to the maximum periodicity T-max if the detected number of the other relay UEs is above a second corresponding number of other relay UEs threshold M2 or the overall distribution of the RD announcements in proximity is above a second corresponding overall distribution of the RD announcements threshold D2. In this case, the timing for broadcasting the RD announcement may be on any available resources.

Again, the relay UE may transmit the RD announcements for example on the first available resources which can be selected by the relay UE in case the autonomous resource allocation mode (mode 2) is used or which are allocated by a serving gNB in case the network-scheduled resource allocation mode (mode 1) is used. Thus, the timing for broadcast the RD announcements may not necessarily be in a fixed time slot or subframe.

The periodicity for broadcasting RD announcements may be set to a periodicity T between the minimum periodicity T-min and the maximum periodicity T-max if the detected number of the other relay UEs is between the first corresponding number of the other Relay UE M1 and the second corresponding number of the other relay UE thresholds M2 or the overall distribution of the RD announcements in proximity is in between the first corresponding overall distribution of the RD announcements threshold D1 and the second corresponding overall distribution of the RD announcements threshold D2.

The periodicity T and the timing for broadcasting the RD announcement may be selected so that the periodicity T may be as large as possible while the overall distribution of the RD announcements in proximity is increased above the second corresponding overall distribution of the RD announcements threshold D2 or is increased as much as possible. However, for simplicity as well as fairness in term of discoverability among relay UEs, there may be a single periodicity T in between the minimum periodicity T-min and the maximum periodicity T-max.

In case Model A is used, to enable and facilitate the detection of other relay UEs in proximity, the relay UE may ensure that different relay UEs in proximity have different timings for broadcasting the RD announcements as much as possible via the resource selection for broadcasting the RD announcements.

The load at the relay UE may be taken into account for determining which of Model A and Model B is to be used as well as the periodicity and/or timing for broadcasting the RD announcements in case Model A is used. For example, in case the load at the relay UE is above a load threshold the relay UE may use Model B or the relay UE may use the maximum periodicity T-max for broadcasting the RD announcements in case Model A is used.

The proposed criteria and conditions for using Model A and Model B or rules and constraints for determining the periodicity and/or timing for broadcasting the RD announcements in case Model A is used may be pre-configured to the relay UE by the serving network.

In case the same destination ID is used for transmitting (broadcast) RD messages such as the RD announcement in Model A by the relay UE and the RD solicitation in Model B by the remote UE, the transmitting UE may indicate which of the RD models is used. This can be realized for example using an indication (e.g. 1-bit indication) in SCI or in a header of a medium access control (MAC) packet data unit (PDU) carrying the RD message from the transmitting UE.

A remote UE may monitor RD announcement in Model A and in case none or an insufficient number of RD announcements is received the remote UE may initiate the RD solicitation in Model B.

It will be understood that, although the above aspects focus on discovery of a relay UE for sidelink communication to get network access, these aspects may be applied for the discovery of a UE for sidelink communication without getting network access. This sidelink communication without getting network access may be for one-hop direct UE-to-UE communication or multi-hop UE-to-UE communication via one or more UE-to-UE relay UE(s).

Figure 6:
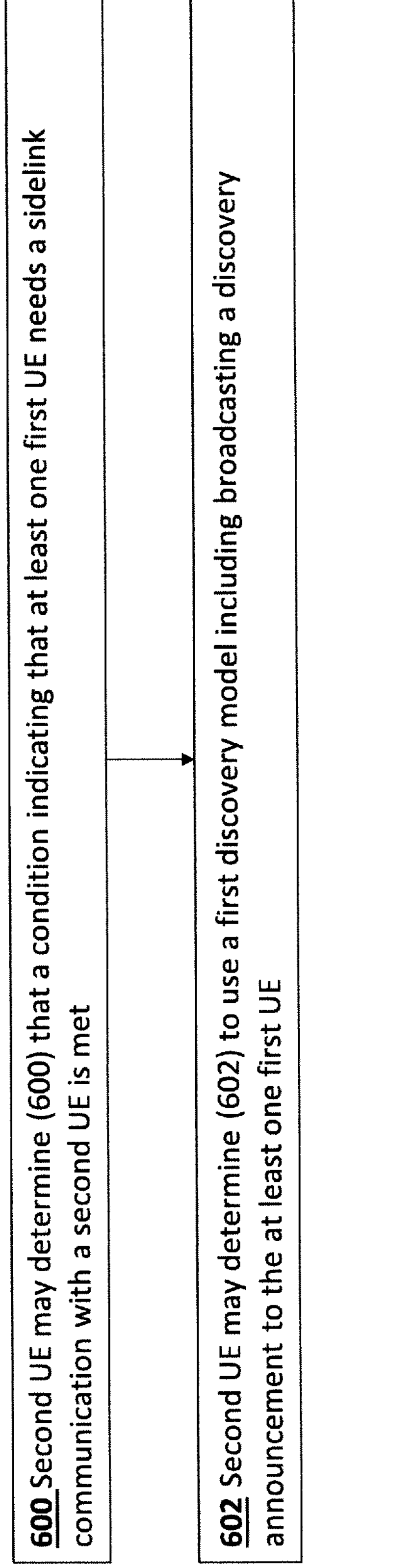
FIG. 6 shows a block diagram of a method for discovering a second user equipment in a communication system.

FIG. 6 shows a block diagram of a method for discovering a second UE in a communication system. The method may be performed by an apparatus, such as a second UE.

In step 600, the apparatus may determine that a condition indicating that at least one first UE needs a SL communication with a second UE is met In step 602, the apparatus may determine to use a first discovery model including broadcasting a discovery announcement to the at least one first UE.

Determining that the condition indicating that at least one first UE needs a SL communication with a second UE is met may comprise determining that a first timer is running.

The first timer may be started or restarted upon: receiving a request to establish a SL connection between the apparatus and at least one first UE from the at least one first UE; expiring the first timer whilst a SL connection is maintained between the apparatus and at least one first UE; releasing a SL connection between the apparatus and at least one first UE; detecting a number of second UE using the first model whilst a second timer is running; and receiving a number of discovery solicitations from at least one first UE whilst using a second discovery model and whilst a third timer is running.

The second timer may be started upon: detecting a first of second UE among the number of second UE using the first discovery model.

The third timer may be started upon: receiving a first discovery solicitation among the number of discovery solicitations.

The apparatus may comprise: means for determining that the condition indicating that at least one first UE needs a SL communication with a second UE is no longer met; and means for determining to use a second discovery model including sending a discovery response to at least one first UE in response to receiving a relay discovery solicitation from the at least one first UE.

The apparatus may comprise: means for adjusting a periodicity and/or timing of discovery announcements based on at least one of: other second UE using the first discovery model and/or a periodicity and/or timing of discovery announcements of the other second UEs; and/or a number of discovery announcements per a given time interval broadcast by the apparatus and the other second UE.

The periodicity of discovery announcements may be comprised between a minimum periodicity of discovery announcements and a maximum periodicity of discovery announcements.

The apparatus may comprise: means for adjusting a periodicity and/or timing of discovery announcements so that the periodicity of discovery announcements is as large as possible whilst ensuring that a number of discovery announcements per the given time interval broadcast by the apparatus and the other second UE is above a discovery announcements threshold.

The apparatus may comprise: means for setting the periodicity of discovery announcements to the minimum periodicity of discovery announcements when the number of other second UE using the first discovery model is below a first number of other second UE threshold or a number of discovery announcements per the given time interval broadcast by other second UE is below a first number of discovery announcements threshold; means for setting the periodicity of discovery announcements to the maximum periodicity of discovery announcements when the number of other second UE using the first discovery model is above a second number of other second UE threshold or a number of discovery announcements per the given time interval broadcast by other second UE is above a second number of discovery announcements per the given time interval threshold; and means for setting the periodicity of discovery announcements between the minimum periodicity of discovery announcements and the maximum periodicity of discovery announcements when the number of other second UE using the first discovery model is between the first number of other second UE threshold and the second number of other second UE threshold or a number of discovery announcements per the given time interval broadcast by other second UE is between the first number of discovery announcements per the given time interval threshold and the second number of discovery announcements per the given time interval threshold.

The apparatus may comprise: means for determining that a load of the apparatus is above a load threshold; means for determining to use the second discovery model or means for setting the periodicity of the discovery announcement to the maximum periodicity of discovery announcements.

The apparatus may comprise: means for receiving the condition indicating that at least one first UE needs a SL communication with a second UE from the network.

Figure 7:
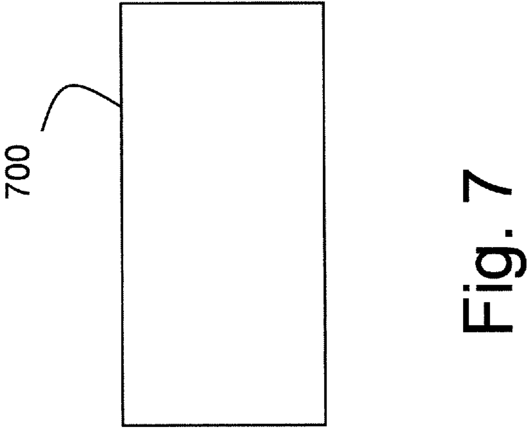
FIG. 7 shows a schematic representation of a non-volatile memory medium storing instructions which when executed by a processor allow a processor to perform one or more of the steps of the method of FIG. 6.

FIG. 7 shows a schematic representation of non-volatile memory media 700 storing instructions and/or parameters which when executed by a processor allow the processor to perform one or more of the steps of the method of FIG. 6.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 6, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A second user equipment comprising at least one processor; and at least one memory storing instructions that, when executed by the at least one processor, cause the second user equipment to:

determine that a condition indicating that at least one first user equipment needs a sidelink communication with the second user equipment is met, wherein determining that the condition indicating that at least one first user equipment needs the sidelink communication with the second user equipment is met comprises determining that a first timer is running;

determine to use a first discovery model including broadcasting a discovery announcement to the at least one first user equipment upon the condition being met; and adjust a periodicity and/or timing of discovery announcements based on at least one of:

other second user equipment using the first discovery model and/or a periodicity and/or timing of discovery announcements of the other second UEs; and/or a number of discovery announcements per a given time interval broadcast by the second user equipment and the other second user equipment.

2. The second user equipment of claim 1, wherein the first timer is started or restarted upon:

receiving a request to establish a sidelink connection between the second user equipment and the at least one first user equipment;

the first timer expiring whilst the sidelink connection is maintained between the second user equipment and the at least one first user equipment;

releasing the sidelink connection between the second user equipment and the at least one first user equipment;

detecting a number of other second user equipments using the first model whilst a second timer is running; and receiving a number of discovery solicitations from the at least one first user equipment whilst using a second discovery model and whilst a third timer is running.

3. The second user equipment of claim 2, wherein the second timer is started upon:

detecting a first second user equipment among the number of second user equipments using the first discovery model.

4. The second user equipment of claim 2, wherein the third timer is started upon:

receiving a first discovery solicitation among the number of discovery solicitations.

5. The second user equipment of claim 1, wherein the at least one memory further store instructions that, when executed by the at least one processor, cause the second user equipment to:

determine that the condition indicating that at least one first user equipment needs the sidelink communication with the second user equipment is no longer met; and determine to use a second discovery model including sending a discovery response to at least one first user equipment in response to receiving a relay discovery solicitation from the at least one first user equipment.

6. The second user equipment of claim 1, wherein the periodicity of discovery announcements is comprised between a minimum periodicity of discovery announcements and a maximum periodicity of discovery announcements.

7. The second user equipment of claim 6, wherein the at least one memory further store instructions that, when executed by the at least one processor, cause the second user equipment to:

set the periodicity of discovery announcements to the minimum periodicity of discovery announcements when the number of other second user equipments using the first discovery model is below a first number of other second user equipments threshold or the number of discovery announcements per the given time interval broadcast by other second user equipments is below a first number of discovery announcements threshold;

set the periodicity of discovery announcements to the maximum periodicity of discovery announcements when the number of other second user equipments using the first discovery model is above a second number of other second user equipments threshold or the number of discovery announcements per the given time interval broadcast by other second user equipments is above a second number of discovery announcements per the given time interval threshold; and set the periodicity of discovery announcements between the minimum periodicity of discovery announcements and the maximum periodicity of discovery announcements when the number of other second user equipments using the first discovery model is between the first number of other second user equipments threshold and the second number of other second user equipments threshold or the number of discovery announcements per the given time interval broadcast by other second user equipments is between the first number of discovery announcements per the given time interval threshold and the second number of discovery announcements per the given time interval threshold.

8. The second user equipment of claim 1, wherein the at least one memory further store instructions that, when executed by the at least one processor, cause the second user equipment to:

adjust the periodicity and/or the timing of the discovery announcements so that the periodicity of discovery announcements is as large as possible whilst ensuring that the number of discovery announcements per the given time interval broadcast by the second user equipment and the other second user equipment is above a discovery announcements threshold.

9. The second user equipment of claim 1, wherein the at least one memory further store instructions that, when executed by the at least one processor, cause the second user equipment to:

determine that a load of the second user equipment is above a load threshold;

determine to use the second discovery model or set a periodicity of a discovery announcement to a maximum periodicity of discovery announcements.

10. The second user equipment of claim 1, wherein the at least one memory further store instructions that, when executed by the at least one processor, cause the second user equipment to:

receive the condition indicating that at least one first user equipment needs a sidelink communication with the second user equipment from the network.

11. A method comprising:

determining, by a second user equipment, that a condition indicating that at least one first user equipment needs a sidelink communication with the second user equipment is met, wherein determining that the condition indicating that at least one first user equipment needs the sidelink communication with the second user equipment is met comprises determining that a first timer is running;

determining, by the second user equipment, to use a first discovery model including broadcasting a discovery announcement to the at least one first user equipment upon the condition being met; and adjusting a periodicity and/or timing of discovery announcements based on at least one of:

other second user equipment using the first discovery model and/or a periodicity and/or timing of discovery announcements of the other second UEs; and/or a number of discovery announcements per a given time interval broadcast by the second user equipment and the other second user equipment.

12. The method of claim 11, wherein the first timer is started or restarted upon:

receiving a request to establish a sidelink connection between the second user equipment and the at least one first user equipment;

the first timer expiring whilst a sidelink connection is maintained between the second user equipment and the at least one first user equipment;

releasing a sidelink connection between the apparatus and the at least one first user equipment;

detecting a number of other second user equipments using the first model whilst a second timer is running; and receiving a number of discovery solicitations from the at least one first user equipment whilst using a second discovery model and whilst a third timer is running.

13. The method of claim 12, wherein the second timer is started upon:

detecting a first second user equipment among the number of second user equipments using the first discovery model.

14. The method of claim 12, wherein the third timer is started upon:

receiving a first discovery solicitation among the number of discovery solicitations.

15. The method of claim 11, further comprising:

determining that the condition indicating that at least one first user equipment needs the sidelink communication with the second user equipment is no longer met; and determining to use a second discovery model including sending a discovery response to at least one first user equipment in response to receiving a relay discovery solicitation from the at least one first user equipment.

16. A non-transitory computer readable medium comprising computer executable instructions stored thereon which, when run on one or more processors, perform:

determining, by a second user equipment, that a condition indicating that at least one first user equipment needs a sidelink communication with the second user equipment is met, wherein determining that the condition indicating that at least one first user equipment needs the sidelink communication with the second user equipment is met comprises determining that a first timer is running;

determining, by the second user equipment, to use a first discovery model including broadcasting a discovery announcement to the at least one first user equipment upon the condition being met; and adjusting a periodicity and/or timing of discovery announcements based on at least one of:

other second user equipment using the first discovery model and/or a periodicity and/or timing of discovery announcements of the other second UEs; and/or a number of discovery announcements per a given time interval broadcast by the second user equipment and the other second user equipment.

* * * * *